US012778013B2

(12) United States Patent
Straeter

(10) Patent No.: US 12,778,013 B2
(45) Date of Patent: Nov. 3, 2026

(54) STOVER CONVEYOR SYSTEM

(71) Applicant: James E. Straeter, Rochester, IN (US)

(72) Inventor: James E. Straeter, Rochester, IN (US)

(*) Notice: Subject to any disclaimer, the term of this patent is extended or adjusted under 35 U.S.C. 154(b) by 721 days.

(21) Appl. No.: 17/704,774

(22) Filed: Mar. 25, 2022

(65) Prior Publication Data

US 2022/0304233 A1 Sep. 29, 2022

Related U.S. Application Data

(60) Provisional application No. 63/165,765, filed on Mar. 25, 2021.

(51) Int. Cl.
*A01D 45/02* (2006.01)

(52) U.S. Cl.
CPC .................................. *A01D 45/021* (2013.01)

(58) Field of Classification Search
CPC .......................... A01D 45/021; A01D 34/8355
See application file for complete search history.

(56) References Cited

U.S. PATENT DOCUMENTS 1,021,855 A * 4/1912 Weigel ............... A01D 34/8355 56/60
1,367,861 A * 2/1921 Churchman ........... A01D 45/02 56/59
1,730,056 A * 10/1929 Bradley ................. A01D 45/02 56/16.4 R
1,794,654 A * 3/1931 Thiemann ............ A01D 43/081 56/61
2,302,973 A * 11/1942 Sargent .............. A01D 34/8355 241/86.2
2,513,941 A * 7/1950 Hyman .................. A01D 45/02 56/66
2,816,410 A * 12/1957 Nobles ................. A01D 34/661 56/13.6
2,961,820 A * 11/1960 Hadley ................ A01D 45/021 56/119
3,156,079 A * 11/1964 Park ..................... A01D 45/021 56/2
3,298,162 A * 1/1967 Medd ..................... A01D 45/02 56/2
3,499,272 A * 3/1970 Looker ................ A01D 45/021 56/109
3,584,443 A * 6/1971 Bulin ..................... A01D 45/02 56/13.8
3,601,957 A * 8/1971 Duncan .................. A01D 45/10 56/13.8
4,009,557 A * 3/1977 Reicks ................... A01D 45/22 56/98

(Continued)

FOREIGN PATENT DOCUMENTS

CA 2551309 C * 4/2011 ........... A01D 89/004
CA 3210194 A1 * 2/2024 ............. A01D 57/20

(Continued)

*Primary Examiner* — Arpad Fabian-Kovacs
(74) *Attorney, Agent, or Firm* — ZarleyConley PLC

(57) ABSTRACT

A stover conveyor system that extends between a corn head and a stover chopper having a first end and a second end. The first end of the stover conveyor is connected to a lift cylinder with a first mounting member, the second end is connected to a frame of a combine with a second mounting member, and a third mounting member is connected to the frame and the stover chopper.

10 Claims, 3 Drawing Sheets

(56) References Cited

U.S. PATENT DOCUMENTS

| | | | | | |
|---|---|---|---|---|---|
| 4,182,098 | A * | 1/1980 | Kass | A01D 57/20 56/192 |
| 4,215,527 | A * | 8/1980 | Shriver | A01D 43/082 56/98 |
| 4,251,980 | A * | 2/1981 | Miller | A01D 45/021 56/98 |
| 4,524,571 | A * | 6/1985 | Mak | A01D 45/021 56/119 |
| 4,567,719 | A * | 2/1986 | Soots | A01D 41/10 56/364 |
| 5,157,904 | A * | 10/1992 | Otten | A01D 45/10 56/60 |
| 7,874,135 | B2 * | 1/2011 | Nagy | A01D 34/8355 56/504 |
| 10,039,230 | B2 * | 8/2018 | Vande Ryse | A01D 45/021 |
| 2005/0120694 | A1 * | 6/2005 | Calmer | A01D 45/021 56/14.7 |
| 2008/0261668 | A1 * | 10/2008 | Stukenholtz | A01F 11/06 460/44 |
| 2012/0023883 | A1 * | 2/2012 | Straeter | A01D 43/081 56/60 |
| 2021/0378178 | A1 * | 12/2021 | Lauwers | A01D 45/023 |

FOREIGN PATENT DOCUMENTS

| | | | | |
|---|---|---|---|---|
| CN | 1675980 | A * | 10/2005 | A01D 75/002 |
| CN | 106717517 | A * | 5/2017 | A01D 75/002 |
| CN | 206821297 | U * | 1/2018 | A01D 45/02 |
| CN | 108617266 | A * | 10/2018 | A01D 45/021 |
| CN | 108617266 | B * | 6/2020 | A01D 43/08 |
| CN | 217826000 | U * | 11/2022 | A01D 45/02 |
| DE | 1917605 | A1 * | 11/1971 | A01D 45/10 |
| DE | 2527645 | A * | 1/1976 | A01D 45/021 |
| DE | 2735784 | A * | 2/1978 | A01D 43/082 |
| DE | 2814207 | A * | 10/1978 | A01D 45/021 |
| DE | 10016407 | C2 * | 12/2002 | A01D 45/02 |
| DE | 10232802 | A1 * | 2/2004 | A01D 45/021 |
| DE | 102004020447 | A1 * | 12/2005 | A01D 34/8355 |
| DE | 102005025319 | A1 * | 12/2006 | A01D 34/83 |
| DE | 102008050146 | B4 * | 11/2011 | B65G 47/18 |
| DE | 102017222587 | A1 * | 10/2018 | A01D 41/12 |
| EP | 0179930 | A1 * | 5/1986 | A01D 45/021 |
| EP | 0423626 | A1 * | 4/1991 | A01D 34/8355 |
| EP | 1483953 | A1 * | 12/2004 | A01D 41/06 |
| EP | 2430900 | A1 * | 3/2012 | A01D 34/83 |
| EP | 3272199 | A1 * | 1/2018 | A01D 34/8355 |
| EP | 3964046 | A1 * | 3/2022 | A01D 34/81 |
| EP | 4070642 | A1 * | 10/2022 | A01D 34/8355 |
| FR | 2275983 | A1 * | 1/1976 | A01D 45/021 |
| FR | 2418621 | A1 * | 9/1979 | A01D 41/14 |
| RU | 179951 | U1 * | 5/2018 | A01D 45/00 |
| RU | 185836 | U1 * | 12/2018 | A01D 45/028 |
| SU | 1729325 | A1 * | 4/1992 | A01D 91/04 |
| WO | WO-9909803 | A1 * | 3/1999 | A01D 45/021 |
| WO | WO-0174142 | A1 * | 10/2001 | A01D 45/02 |

* cited by examiner

STOVER CONVEYOR SYSTEM

CROSS REFERENCE TO RELATED APPLICATION

This application claims the benefit of U.S. Provisional Application Ser. No. 63/165,765 filed Mar. 25, 2021, the contents of this application is hereby incorporated by reference in its entirety.

BACKGROUND OF THE INVENTION

The present invention is directed to a stover conveyor system and more particularly to a mounting and guide system for a stover conveyor when the conveyor transports stover from the corn head to the rear of the combine.

When harvesting stover one challenge is to position the stover conveyor in the correct position to accept material from a corn head to be transported while respecting the limited vertical space which exists under a combine. An additional challenge occurs when the corn head is raised for transport and the conveyor also needs to be raised to avoid contact with the ground.

Another issue is that all corn heads have a lateral tilt where the outer ends of the corn head will remain close to the ground when the corn head and combine angle change due to ground level variations, plus it is difficult to keep the chopper drive on the rear of a conveyor relatively stable so that the drive mechanism driving the chopper doesn't require intricate drives, as there is limited space to add multiple components to overcome distance change.

Finally, there are issues with the placement of the stover at the point of entry on the conveyor as well as issues in managing the depth of the conveyor while transported. When stover is discharged from a combine auger it is relatively loose and essentially airborne as it travels in the same direction as the conveyor. This makes it difficult for proper placement of the stover on the conveyor, plus a cross wind can move material off the conveyor reducing yields. The depth of the stover is also a critical matter, as if the height of the stover is not correct it will contact the bottom of the combine and plug the conveyor.

An objective of the current invention is to provide a stover conveyor system that is positioned to accept material from a corn head in the limited space available under the combine. Another objective of the present invention is to provide a stover conveyor system which provides for proper placement of stover on the conveyor and protects against cross winds.

These and other objectives will be apparent of one having ordinary skill in the art based upon the following written description, drawings and claims.

SUMMARY OF THE INVENTION

A stover conveyor system includes a stover conveyor that extends from a corn head to a stover chopper and has a first end and a second end. The first end of the conveyor is connected to a lift cylinder component with a first mounting member. The second end of the stover conveyor is connected to a frame with a second mounting member. A third mounting member is connected to the frame and the stover chopper.

The first mounting member is pivotal, and the second and third mounting members are pivotal at both ends. In addition, a stover guide is positioned over at least a portion of the first end of the stover conveyor, the stover guide having an adjustable door.

DETAILED DESCRIPTION

Figure 1:
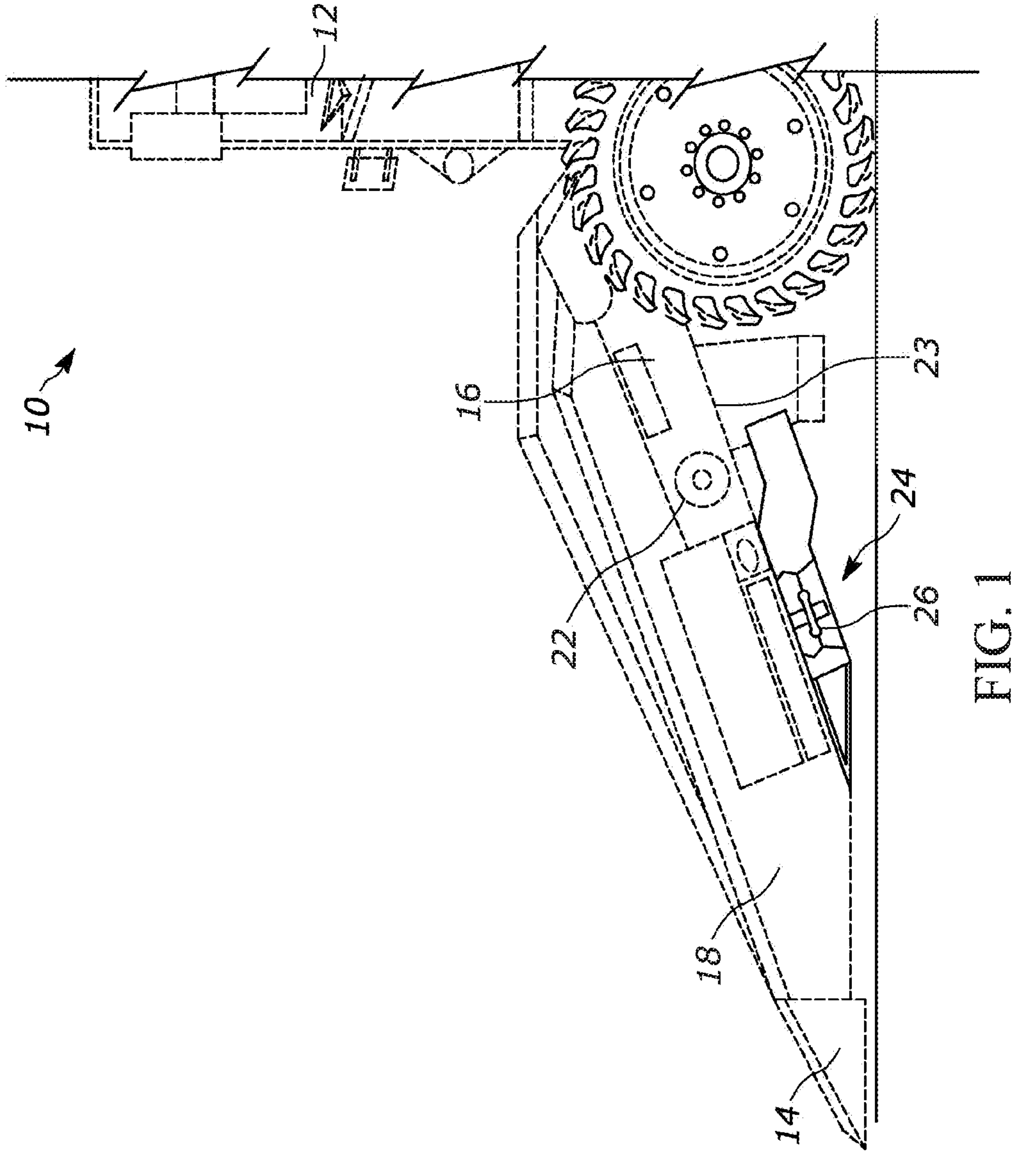
FIG. 1 PRIOR ART
FIG. 1 is a side view of a combine with corn head.
Figure 2:
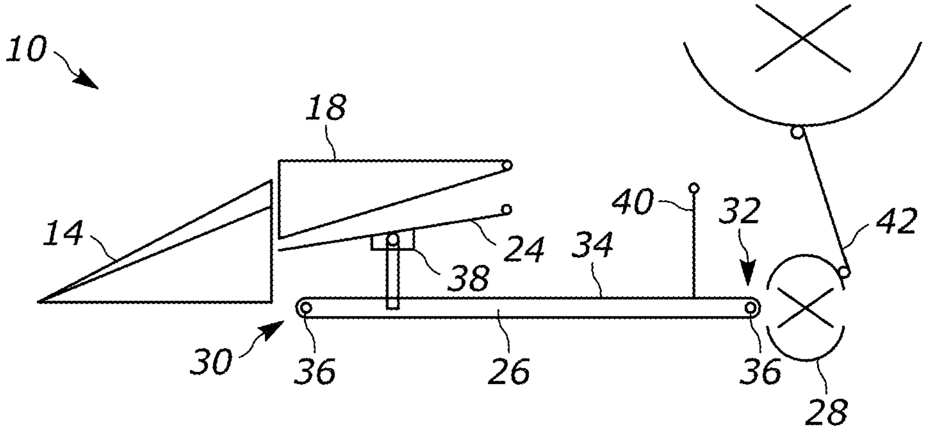
FIG. 2 is a side view of a stover conveyor.
Figure 3:
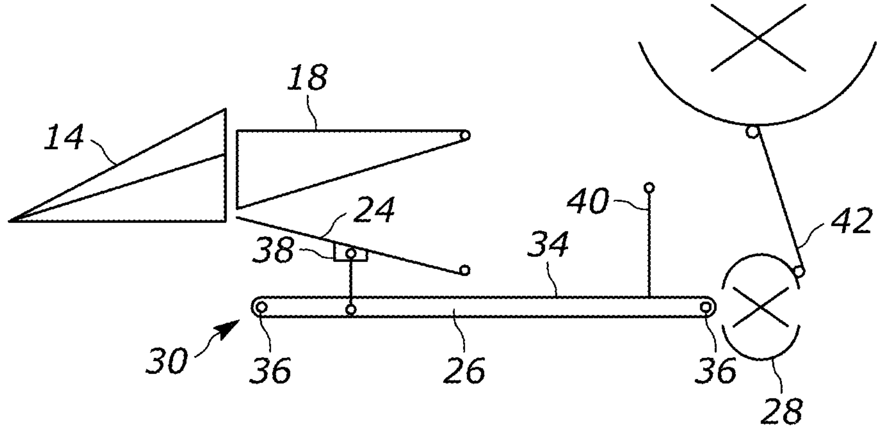
FIG. 3 is a side view of a stover conveyor.
Figure 4:
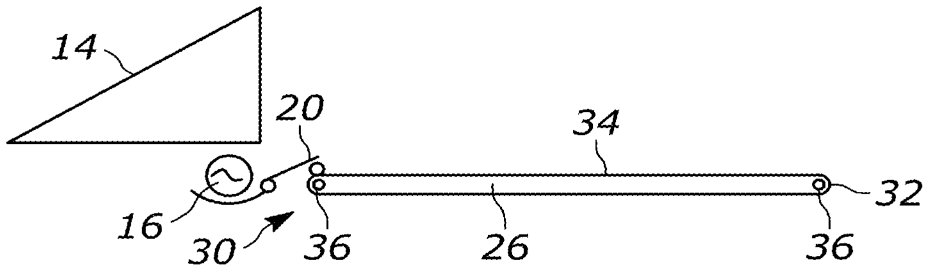
FIG. 4 is a side view of a stover conveyor.
Figure 5:
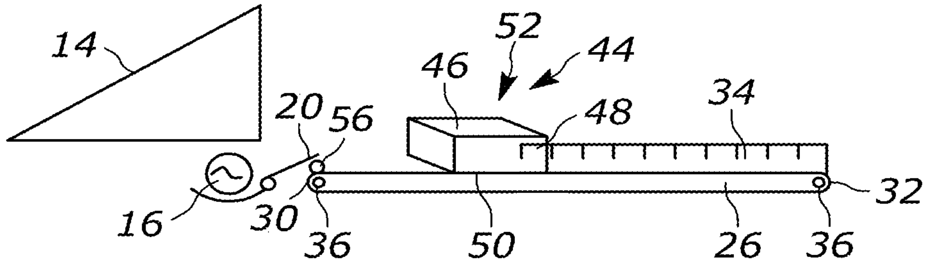
FIG. 5 is a side view of a stover conveyor.

Referring to the Figures, a stover conveyor system 10 is used with an agricultural implement 12 such as a combine. The combine 12 has a corn head 14 connected to an auger 16 and a feeder 18 having a feeder plate 20. Adjacent the feeder 18 is a combine chopper 22, wherein the corn head 14, auger 16, feeder 18, and chopper 22 are all connected to a frame 23. Connected to the corn head 14 is a lift cylinder 24 that is used to raise and lower the corn head 14 from a harvest position to a transport position.

Positioned below the combine is a stover conveyor 26 that is used to transport stover from the corn head 14 to a stover chopper 28. The conveyor 26 has a first or front end 30 and a second or rear end 32 and also includes a continuous belt 34 mounted about a pair of pulleys 36. The first end 30 of the conveyor 26 is connected to the lift cylinder 24 with a non-pivotal mounting member 38. The rear or second end 32 of the conveyor is connected to the frame 23 of the combine 12 with a second mounting member 40 such as a link that is pivotally connected at both ends, and a third mounting member 42 is pivotally connected at both ends to the stover chopper 28 and the frame 23 of the combine 12.

Positioned over at least a portion of the first end 30 of the conveyor 26 is a stover guide 44. While the stover guide is of any size, shape and structure, in the example shown, the guide 44 has a top wall 46 that terminates into a pair of parallel spaced side walls 48 that are connected at their ends to a conveyor frame 50. Pivotally connected to the top wall 46 and moveable toward the conveyor 26 is a door or gate 52.

In operation, in a harvest position the separation between the auger 16 and the conveyor 12 is minimal and the feed plate 54 of the feeder 18 will come to rest on a conveyor bar 56 positioned just above the conveyor belt 34. The feeder plate 20 is hingedly connected to the auger housing so that when the corn head 14 tilts laterally the feeder plate 20 remains on the conveyor bar 56 to direct stover to the belt 34 in an ideal position.

The stover guide 44 works like a tent to prevent crosswinds from blowing the stover off the belt 34 and keeps the stover within the width of the belt 34 regardless of the wind. To prevent the stover from contacting the combine 12 and also to prevent plugging as it is transported along the length of the conveyor 26 the door 52 is moved away from the top wall 46 of the guide 44 toward the belt 34 and set at a desired height. As a result, the loose configuration of stover becomes a more compact, dense stream of stover instead of one with a lot of unused space between stover material particles. The stover is then transported to the stover chopper 28.

When the corn head 14 is raised to a transport position the separation between the auger 16 and the conveyor 26 is increased and as the corn head 14 is well above the harvest position, the conveyor 26 is raised as high as possible without contacting the combine 12. The movement at the rear end 32 of the conveyor 26 is minimal because the second mounting member 40 connected to the frame 23 is close to the rear end 32 of the conveyor 26. Still, there is some vertical space at the rear 32 of the conveyor 26. In order to keep the belt drive relatively stable, the stover chopper 28 mounted at the rear end 32 of the conveyor 26 is pivotally connected to the frame 23 to minimize vertical movement as the idler on the belt manages the distance change.

From the above discussion and accompanying figures and claims it will be appreciated that the stover conveyor system 10 offers many advantages over the prior art. It will be appreciated further by those skilled in the art that other various modification could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A stover conveyor system, comprising:

a stover conveyor that extends from a corn head to a stover chopper and having a first end and a second end;

the first end of the conveyor connected to a lift cylinder with a first mounting member, wherein the first mounting member is non-pivotal;

the second end of the conveyor is connected to a frame with a second mounting member; and a third mounting member connected to the stover chopper and the frame.

2. The system of claim 1 wherein the second mounting member is pivotal at both ends.

3. The system of claim 1 wherein the third mounting member is pivotal at both ends.

4. The system of claim 1 further comprising a stover guide positioned over at least a portion of the first end of the stover conveyor.

5. The system of claim 4 wherein the stover guide has a door.

6. The system of claim 1 wherein the lift cylinder is configured to raise and lower a corn head.

7. The stover conveyor system of claim 1 further comprising the corn head connected to the lift cylinder.

8. The stover conveyor system of claim 4 further comprising the stover guide having a pair of sidewalls connected to a gate.

9. A stover conveyor system, comprising:

a stover conveyor that extends from a corn head to a stover chopper and having a first end and a second end;

the first end of the conveyor non-pivotally connected to a lift cylinder with a non-pivotal mounting member;

a link pivotally connected to the second end of the conveyor and pivotally connected to a frame of an agricultural implement; and a pivotal mounting member pivotally connected to the stover chopper and the frame.

10. The stover conveyor system of claim 9 wherein the stover conveyor is configured to transport stover from the corn head to the stover chopper.

* * * * *